(12) United States Patent
McMahon

(10) Patent No.: US 9,104,224 B2
(45) Date of Patent: Aug. 11, 2015

(54) ANALOG COMPENSATOR CIRCUIT TO COMPENSATE FOR CABLE LOSS

(71) Applicant: Checkpoint Systems, Inc., Thorofare, NJ (US)

(72) Inventor: Michael T. McMahon, Salem, OH (US)

(73) Assignee: Checkpoint Systems, Inc., Thorofare, NJ (US)

( * ) Notice: Subject to any disclaimer, the term of this patent is extended or adjusted under 35 U.S.C. 154(b) by 136 days.

(21) Appl. No.: 13/853,165

(22) Filed: Mar. 29, 2013

(65) Prior Publication Data

US 2013/0257404 A1 Oct. 3, 2013

Related U.S. Application Data

(60) Provisional application No. 61/617,907, filed on Mar. 30, 2012.

(51) Int. Cl.
*G06F 13/38* (2006.01)
*G05F 1/656* (2006.01)

(52) U.S. Cl.
CPC ..................... *G05F 1/656* (2013.01)

(58) Field of Classification Search
None
See application file for complete search history.

(56) References Cited

U.S. PATENT DOCUMENTS

| | | | |
|---|---|---|---|
| 4,815,106 A * | 3/1989 | Propp et al. | 375/257 |
| 5,034,622 A * | 7/1991 | Kuzmik | 307/149 |
| 6,348,780 B1 * | 2/2002 | Grant | 323/222 |
| 6,396,879 B1 * | 5/2002 | Yoshimura et al. | 375/297 |
| 6,804,129 B2 * | 10/2004 | Lin | 363/98 |
| 2003/0085621 A1 * | 5/2003 | Potega | 307/18 |
| 2010/0097733 A1 * | 4/2010 | E. | 361/42 |
| 2011/0194316 A1 * | 8/2011 | Morota | 363/21.17 |
| 2011/0228571 A1 * | 9/2011 | Lin et al. | 363/21.16 |
| 2011/0234323 A1 * | 9/2011 | Jang | 330/297 |
| 2011/0319015 A1 * | 12/2011 | Canegallo et al. | 455/41.1 |

* cited by examiner

*Primary Examiner* — Michael Sun
(74) *Attorney, Agent, or Firm* — Richard A. Howe, II

(57) ABSTRACT

Apparatus, systems and methods for correcting data received from a power cable is presented. A method receives communication data from a near end of a cable that has near and far ends. The data is compared using hysteresis to a high threshold and/or a low threshold. The data is reset to produce corrected data by resetting the data to either a high value or a low value based on the comparing. For example, when the corrected data is high, the data is reset to a low value when the communication data crosses the low threshold and when the corrected data is low, the data is reset to a high value when the communication data crosses the high threshold. The corrected data can provide a power supply data needed so that it can more accurately provide a power through the cable to the far end of the cable.

19 Claims, 4 Drawing Sheets

ANALOG COMPENSATOR CIRCUIT TO COMPENSATE FOR CABLE LOSS

CROSS REFERENCE TO RELATED APPLICATION

This application claims priority from U.S. Provisional Application Ser. No. 61/617,907, filed Mar. 30, 2012; the disclosure of which is incorporated herein by reference.

BACKGROUND OF THE INVENTION

1. Field of Invention

The current invention relates generally to apparatus, systems and methods for charging and/or supplying power to electronic items. More particularly, the apparatus, systems and methods relate to charging and/or supplying power to electronic items on display in a commercial setting. Specifically, the apparatus, systems and methods provide for charging and/or supplying power to electronic items with the use of advanced techniques to compensate for cable loss.

2. Description of Related Art

Merchants often desire displaying powered-up electronic devices to consumers so that the consumers can handle and explore the various functions of different electronic devices. For example, a merchant may wish to display a variety of different cellular phones so that consumers can handle and evaluate the functionality of each phone. Alternatively, merchants may desire displaying cameras, computer-related devices, electronic games and the like powered-up to allow handling and exploration of these devices.

A display that exhibits electronic items will often show several different electronic items. Traditional power supplies for these types of displays would provide a central power supply that would supply power to each electronic device through a corresponding power cable attached between each electronic device and the central power supply. The central power supply in general supplied one main voltage level to each power cable so that each electronic device needed to be able to accept the same voltage level. Alternatively, voltage converters could be used to convert the main voltage to different voltage levels; however, converters add substantial cost to the powering system and take up additional space. Also, today's electronic devices often require high currents, which increase the voltage loss in the power cable and connectors and result in a significant difference between the voltage supplied by the power supply and what is expected by the electronic device. What is needed is a better way to supply power to electronic items on display in a commercial setting.

SUMMARY OF THE INVENTION

One example embodiment of the invention includes a method for correcting data received via a power cable. A method may include receiving communication data from a near end of a cable that has near and far ends. The communication data can be data representing a measured voltage at the far end of the cable. The method may also include comparing the communication data, possibly using hysteresis, to a reference threshold, a high threshold, and/or a low threshold. The data may be reset to produce corrected data by resetting the data to either a high value or a low value based on the comparing. For example, when the corrected data is high, the data may be reset to a low value when the communication data crosses the low threshold and when the corrected data is low, the data may be reset to a high value when the communication data crosses the high threshold. In some embodiments, the high threshold can be set so that the high threshold is higher than the low threshold. The corrected data can provide data to a power supply so that the power supply can more accurately provide power through the cable to the far end of the cable.

Another configuration of an example embodiment includes a system for supplying power to a cable. The system includes a cable with a near end and a far end, a comparator located at the near end of the cable, a controller located at the far end of the cable, an inverting device, a voltage input device, a single communication wire, and another wire. The comparator can be an operational amplifier (op-amp). The voltage input device may be located at the far end of the cable to input a voltage into the controller. The single communication wire may be located between the comparator and the inverting device and the wire may be between the inverting device and the controller. The controller may communicate data to the inverter which may invert the data to create inverted data. The comparator may compare the inverted data to at least one reference voltage and generate corrected data based, at least in part, on the comparison of the inverted data to the at least one reference voltage. The cable communicates the corrected data to a power supply at the near end of the cable so that the power supply can supply a power through the cable to the far end of the cable that is accurate at the far end of the cable.

In some configurations, the system can include biasing elements to create hysteresis at the comparator between the inverted data and at least one reference voltage, The hysteresis can be implemented using a low threshold and a high threshold. When the corrected data is high, the comparator will not transition the corrected data low until the inverted data goes below the low threshold. When the corrected data is low, the comparator will not transition the corrected data high until the inverted data goes above the high threshold, In yet another configuration, the system can include a voltage measurement device at the far end of the cable for creating a far end voltage value representing the voltage at the far end of the cable. The controller may transmit the far end voltage value over the wire between the inverting device and the controller and the single communication wire to the comparator where it is compared to one or more reference voltages and is adjusted. The power supply then supplies the corrected power through the cable to the far end of the cable that has been corrected based, at least in part, on the far end voltage value.

Other configurations of some example embodiments can include other useful devices and features. For example, the system can include a low voltage dropout (LDO) regulator to stabilize the voltage at an analog-to-digital converter (ADC) in the controller that is used to sample the voltage (e.g., power) at the far end of the cable. The system could include a Schottky diode and a capacitor that is used to maintain a high voltage value when the single communication wire is driven low so that the controller has a steady power supply. The inverting device could be a bipolar junction transistor (BJT) with its gate connecting the wire to the controller, its emitter connected to the single communication wire, and its collector connected to ground.

In another configuration of an example embodiment, a system, for example for receiving a noisy signal from a power cable, may include comparator logic circuitry, amplification logic circuitry, and a power supply. The comparator logic circuitry may compare a received communication signal received from a power cable to a reference signal. The amplification logic circuitry may amplify the received signal to a corrected output signal that is high when the received communication signal is greater than the reference signal. Similarly, the amplification logic amplifies the received signal to a corrected output signal that is low when the received communication signal is less than the reference signal. This system can send the corrected output signal to the power supply where the corrected output signal may be decoded so that the power supply can adjust a power that the power supply is supplying to the power cable.

In some configurations, this system can have biasing elements configured to create hysteresis between the reference signal and the received communication signal using a low threshold and a high threshold. When the corrected output signal is high, the corrected output signal will not go low until the received communication signal goes below the low threshold. When the corrected output signal is low, the corrected output signal will not go high until the received communication signal goes above the high threshold. The low threshold and the high threshold can be separated by at least one volt or another voltage. A first pair of biasing resistors can be connected in series and the reference voltage can be the voltage between the resistors. A second pair biasing resistors can be used with feedback from the corrected output signal used to bias the received communication signal.

BRIEF DESCRIPTION OF SEVERAL VIEWS OF THE DRAWINGS

One or more example embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
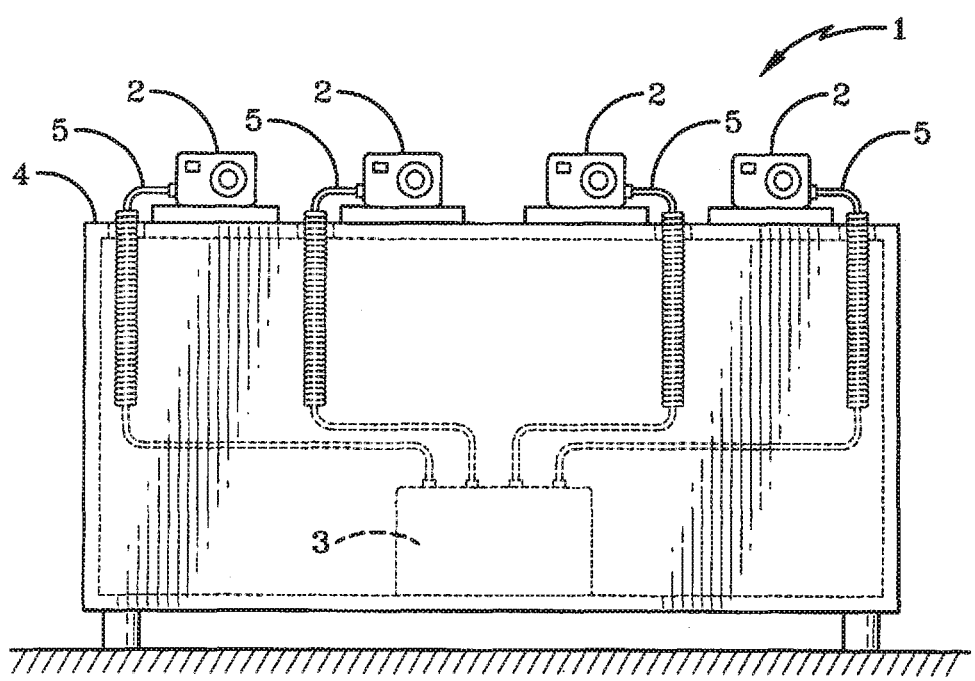
FIG. 1 illustrates an example embodiment of a power supply system.

FIG. 1 illustrates an example embodiment of a power supply system The system 1 provides power to merchandise items 2 displayed at a display cabinet 4 or another type of suitable display at a retail establishment. In FIG. 1, the merchandise items 2 are shown as cameras, however, other merchandise items 2 can be powered by the power supply system 1. For example, the system 1 can power electronic devices such as cellular phones, computers, electronic games and the like. A power supply unit 3 provides power to one or more of the merchandise items 2 through one or more cables 5. The merchandise items 2 may also be secured to a display stand that provides theft deterrence and prevention, for example, by including an audible and/or visual alarm that is triggered by cutting or disconnecting a cable 5 from a merchandise item 2.

"Logic", as used herein, includes but is not limited to hardware, firmware, software and/or combinations of each to perform a function(s) or an action(s), and/or to cause a function or action from another logic, method, and/or system. For example, based on a desired application or need, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics. Building on the forgoing, "logic circuitry" refers to specialized hardware that is specially manufactured to perform desired functionality (e.g., an ASIC, FPGA, etc.) or general purpose hardware (e.g., a processor) that is specially configured via the implementation of software or firmware to perform desired functionality.

Figure 2:
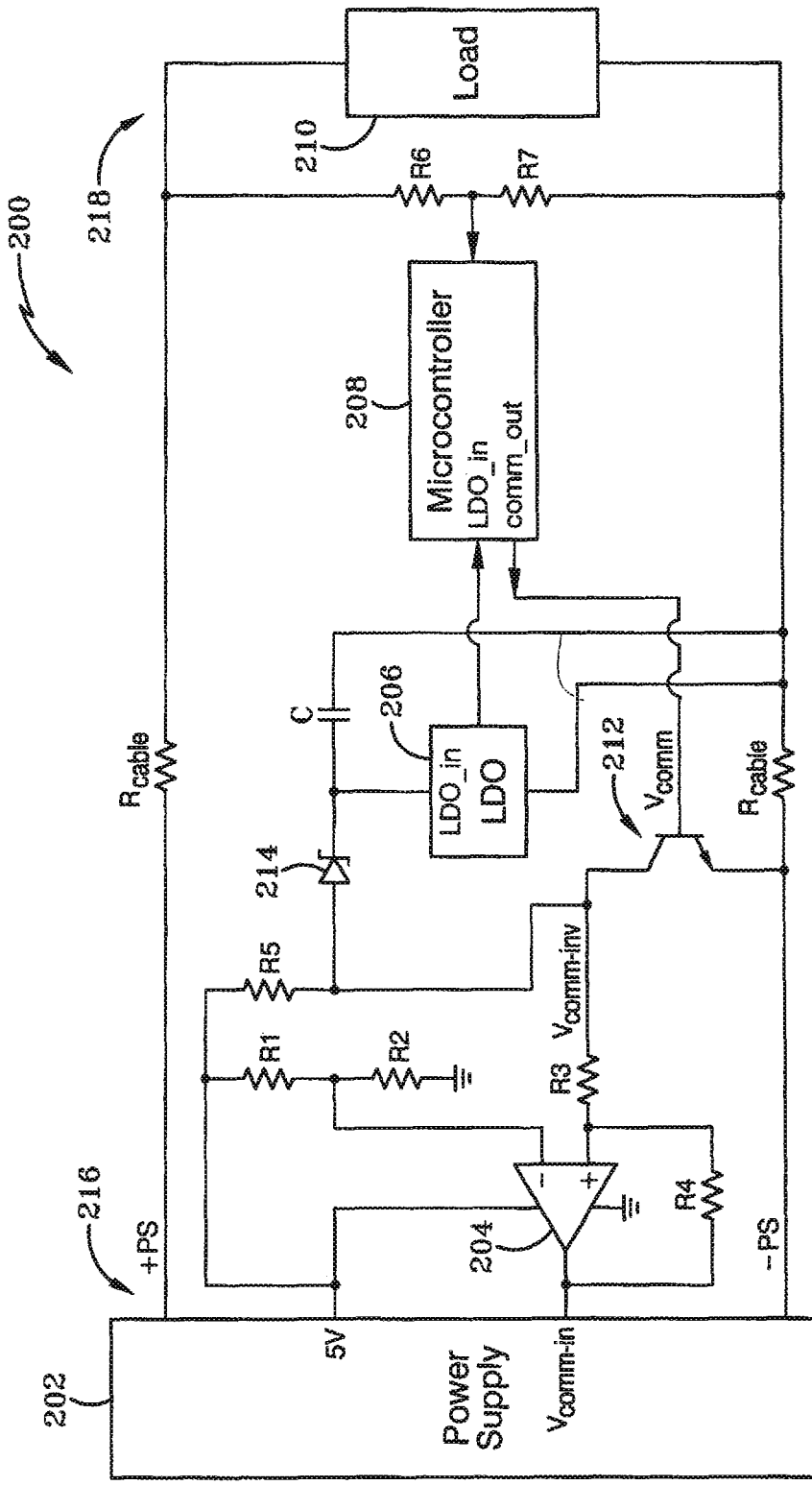
FIG. 2 illustrates an example schematic of an example embodiment of a power supply system.

FIG. 2 illustrates some example features and components of an example embodiment of a schematic of a circuit 200 for adjusting the voltage of a signal ($V_{comm}$) communicated on a power cable to a power supply 202. The power supply is configured to supply power over a cable containing conductors +PS and −PS to a load device 210 such as an electronic device on display at a retail display as shown in FIG. 1. Each conductor +PS and −PS is shown with a loss resistor Rcable that simply models the line loss of each of these cables and that is not actually a resister in the circuit 200 illustrated in FIG. 2. An operational amplifier (op-amp) 204 and resistors R1, R2, R3, R4 are configured to clean up a communication signal Vcomm sent from microcontroller 208 using transistor 212. The Schottky diode 214, low voltage dropout (LDO) regulator and capacitor C are configured to generate a very clean voltage for an analog-to-digital (ND) conversion inside the microcontroller 208.

For easy viewing and understanding, the components of FIG. 2 are illustrated as being distributed widely between the power supply 202 and the load 210. However, in some example embodiments, the op-amp 204 and resistors R1, R2, R3, R4 may be located at the near end 216 of the cable at the power supply 202, and in some embodiments they would be located inside the power supply 202 itself. The transistor 212, Schottky diode 214, low voltage dropout (LDO) regulator 206, capacitor C and the microcontroller 208 are located at the far end 218 of the cable at the load 210. Thus, a three wire cable with conductors/wires +PS, −PC and Vcomm would span between these two cable ends.

Having described the components and structure of the example circuit 200 for adjusting the voltage of a signal (Vcomm) communicated by the microcontroller, its operation and functionality are now discussed. In operation, the power supply 202 supplies the op-amp 204 and the collector of the transistor 212 with a nominal +5 voltage. The Schottky diode 214 and the capacitor C act to store energy in the capacitor C when the emitter of the transistor 212 is turned on as discussed further below. The voltage on the A/D converter inside the microcontroller 208 is used for the reference voltage of A/D converter. Therefore, the low voltage dropout (LDO) regulator 206 is used to generate a very accurate voltage that is input to LDO_in of the microcontroller 208. In this configuration, a 3.6 volt precision voltage reference/WO regulator 206 is used. Using this precision voltage regulator allows for the elimination, or at least the minimization, of line losses and an accurate voltage measurement can be obtained by load voltage sense resistors R6, R7.

The operation of the op-amp 204 will now be discussed ignoring the hysteresis biasing resistors R1, R2, R3, R4 for the moment and assuming they create a theoretical ideal comparison reference voltage of 2.5 volts at the inverting input V− of the op-amp 204. In operation, the microcontroller 208 occasionally needs to communicate with the power supply 202 and does so by transmitting serial data over the Vcomm wire between the transistor 212 and the microcontroller 208 and the Vcomm-inv between the transistor 212 and resistor R3. The microcontroller 208 communicates by sending binary 1s and 0s (represented as 5 volts and 0 volts respectively) over Vcomm to the gate node of the transistor 212.

First, the transmission of a 0 from the microcontroller 208 is discussed and then the transmission of sending a 1 from the microcontroller 208 is discussed. When the microcontroller 208 transmits a 0 (0 volts/low value) to the transistor 212, this will not turn on the gate so that the voltage of the emitter of the transistor 212 remains high which means Vcomm-inv is high. Ideally, this high voltage will be 5 volts so that the V+ input of the op-amp 204 is also 5 volts. The op-amp 204 compares this voltage (5 volts) to the reference voltage at V− input (2.5) and determines that a 1 (high value) has been transmitted over Vcomm-inv and drives a 5 volt signal (a high level) into the Vcomm-in input of the power supply 202. If for some reason there were line losses, as well as noise on the Vcomm and Vcomm-inv lines, the voltage received at the V+ input of the op-amp 204 could be, for example, 3.8 volts. Because 3.8 volts is still greater than the reference voltage at V− (which is 2.5 volts), the op-amp 204 still correctly drives a 5 volt signal into the Vcomm-in input of the power supply 202.

When the microcontroller 208 transmits a 1 (5 volts/high value) to the transistor 212, this is more than enough voltage to turn on the transistor 212 to cause current to flow between its emitter and collector. Releasing this current causes Vcomm-inv to go to 0 volts (ground). Now, when the op-amp 204 compares this voltage (0 volts) to the reference voltage at V− input (2.5) it determines that a 0 (low value) has been transmitted over Vcomm-inv and drives a 0 volt signal (a low level) into the Vcomm-in input of the power supply 202. If for some reason there was noise as well as other parasitic disturbances on the Vcomm and Vcomm-inv lines, the voltage received at the V+ input of the op-amp 204 could be, for example, 1.5 volts. Because 1.5 volts is still less than the reference voltage at V− (which is 2.5 volts), the op-amp 204 still correctly drives a 0 volt signal into the Vcomm-in input of the power supply 202. In summary, as long as a 0 value arrives at the op-amp 204 below 2.5 volts and a high arrives above 2.5 volts, the op-amp 204 will always correctly detect the right value and drive the correct low value (0 volts) or correct high value (5 volts) to the power supply's Vcomm-in input.

The four transistors R1, R2, R3, R4 can add hysteresis to the comparisons that the op-amp 204 performs between its V+ input and its reference voltage (V−). For example, when R1=10 k ohms, R2=15 k ohms, R3=10 K ohms and R4=50 k ohms, this biases the op-amp 204 so that the low voltage threshold voltage (Vth low) is 2.5 volts and the high threshold voltage (Vth high) is 3.5 volts. In other words a high voltage has to go lower than 2.5 volts before the op-amp drives a low value to the power supply 202 (the same as above). On the other hand, a low voltage now has to get to 3.5 volts (one voltage above 2.5 volts) before the op-amp 204 will switch from driving a low value (0 volts) to the power supply 202 and begin driving a high value (5 volts) to the power supply 202. Therefore, there can be more noise on a low signal without causing a false transition of a high signal.

Figure 3:
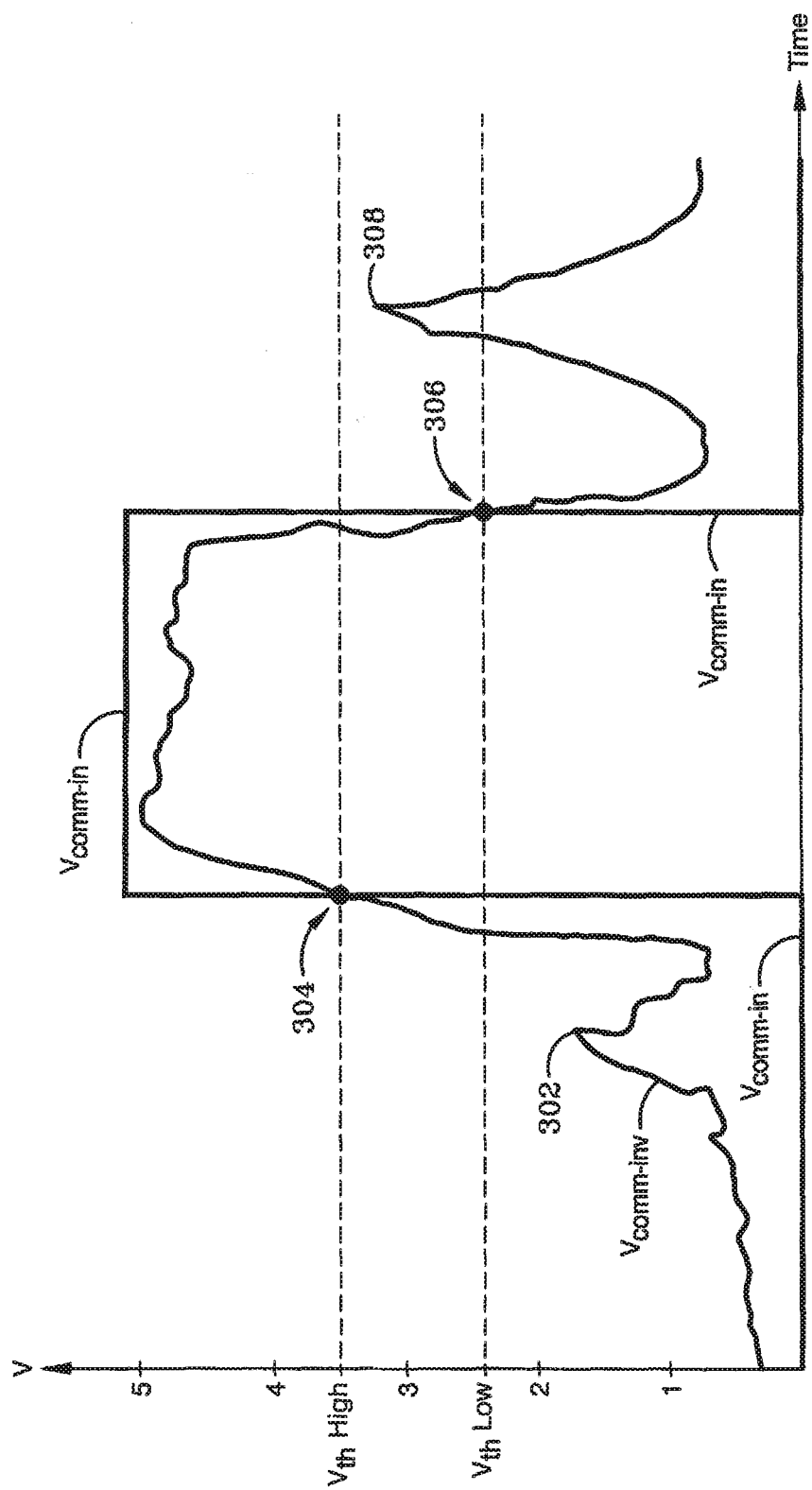
FIG. 3 illustrates an example graph of how hysteresis effects signal Vcomm-in that is input into the power supply.

FIG. 3 illustrates how the op-amp operates with hysteresis wherein the low voltage threshold voltage (Vth low) is 2.5 volts and the high threshold voltage (Vth high) is 3.5 volts. In this illustration, a noise spike on Vcomm-inv was encountered that reached a high point 302, however, this spike only reached about 1.8 volts which is below Vth-high so there was no transition from low to high on the value output from the op-amp to power supply input Vcomm-in. Later, Vcomm-inv does rise to 3.5 volts at point 304 which causes the op-amp to drive a high value (5 volts) to Vcomm-in. This value stays high until that point 306 Vcomm-inv crosses the 2.5 volt level causing the op-amp 204 to switch the value it is driving to the Vcomm-in from a high value to a low value. This value remains low even when a rather large noise spike 308 is later encountered, because the noise never reached Vth-high, 3.5V.

As understood by those of ordinary skill in the art, the resistors R1, R2, R3, R4 can be other values. For example, when R1=10 k ohms, R2=12.2 k ohms, R3=10 K ohms and R4=40 k ohms, this biases the op-amp 204 so that the Vth-low is 2.0 volts and the high threshold voltage Vth-high is 3.44 volts.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
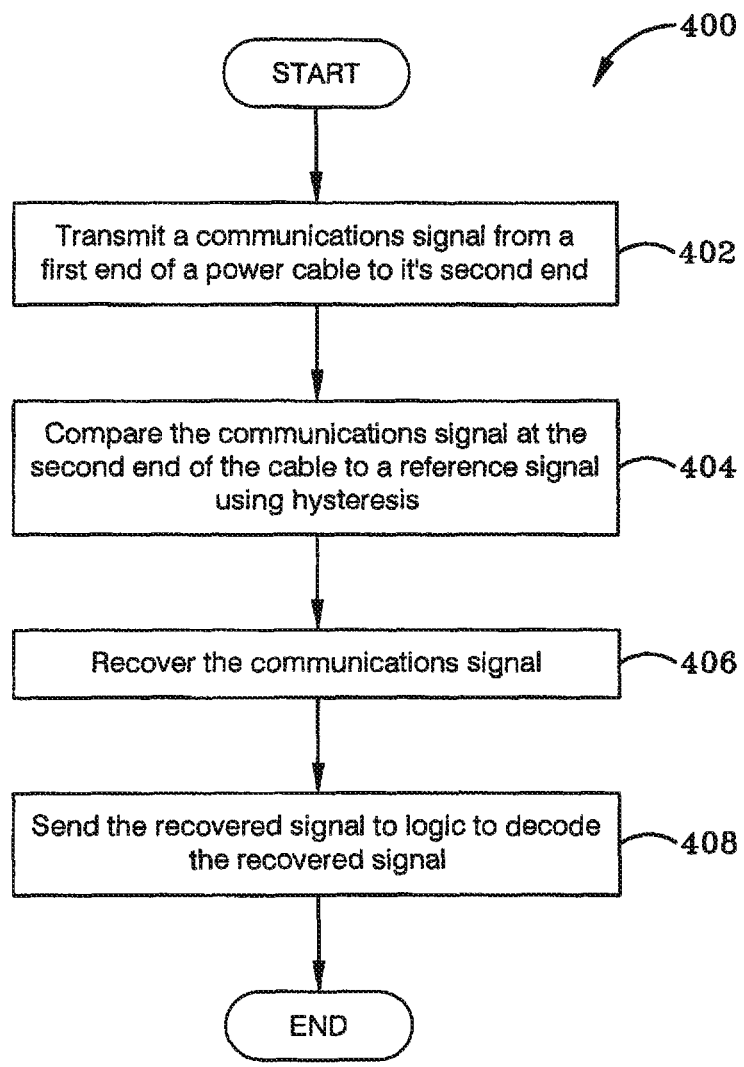
FIG. 4 illustrates an example embodiment of a method of adjusting the communication signal of a power supply cable.

FIG. 4 illustrates a method 400 recovering a noisy signal received at a far end of a power cable. For example, the cable may be a 3-wire cable as discussed above with two power conductors and a single communications wire. The method begins by transmitting, at 402, an original communications signal at a far end of the power cable to a near end of the cable. As discussed above, a microcontroller desiring to communicate with a power supply can generate a signal that turns a transistor on or off to create an inverted signal that is transmitted across the cable to its near end.

The received communication signal at the near end of the cable is compared, at 404, to a reference signal using hysteresis. As discussed above, the signal can be compared and then recovered, at 406, using hysteresis. Hysteresis provides that when a prior signal is high, a low signal is not considered received until the received signal crosses a low threshold. Similarly, when a prior signal is low, a high signal is not considered received until the received signal crosses a high threshold. The recovered signal is then sent to logic, at 408, where it is decoded. For example, the recovered signal that is now accurate signal/data that can represent power requirements at the far end the cable can be sent to a power supply where it can control/inform the power supply about power requirements at the far end of the cable so that the power supply can better supply a more accurate power to the far end of the cable for delivery to the near end of the cable.

In the foregoing description, certain terms have been used for brevity, clearness, and understanding. Such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one configuration", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A system for providing power through a power cable comprising:
    comparator logic circuitry configured to compare a received communication signal to a reference signal, wherein the received communication signal is received from the power cable;
    biasing elements configured to create hysteresis between the reference signal and the received communication signal;
    amplification logic circuitry configured to amplify the received communication signal and output a corrected output signal in accordance with the created hysteresis between the reference signal and the receive communication signal; and
    a power supply configured to decode the corrected output signal output by the amplification logic circuitry and adjust a power output to the power cable responsive to the corrected output signal.

2. The system of claim 1 further comprising:
    a display stand configured to display and secure a merchandise item that is connected at one end of the power cable and wherein the power supply is connected to another end of the cable.

3. The system of claim 1 wherein the created hysteresis comprises:
    a low threshold, wherein when the corrected output signal is high, the amplification logic circuitry is configured not to change the corrected output signal to a low value until the received communication signal goes below the low threshold; and
    a high threshold, wherein when the corrected output signal is low, the amplification logic circuitry is configured not to change the corrected output signal to a high value until the received communication signal goes below the high threshold.

4. The system of claim 3 wherein the low threshold and the high threshold are separated by at least one volt.

5. The system of claim 1 wherein the comparator logic circuitry comprises an operational amplifier (op-amp).

6. The system of claim 1, wherein the biasing elements comprise:
    a first pair of biasing resistors connected in series where the reference signal is the voltage between the first pair of resistors; and
    a second pair biasing resistors with feedback from the corrected output signal configured to bias the received communication signal.

7. The system of claim 1 wherein the power cable has a near end at the power supply and a far end; and
    wherein the system further comprises a transistor at the far end of the cable that is configured to create the received communication signal by inverting an original data signal transmitted from a microcontroller at the far end of the cable.

8. A system for supplying power to a merchandise item comprising:
    a cable with a near end and a far end;
    a comparator located in the near end of the cable;
    a controller located in the far end of the cable;
    an inverting device located in the cable;
    a voltage input device at the far end of the cable to input a voltage into the controller;
    a single communication wire located between the comparator and the inverting device;
    a second wire between the inverting device and the controller; and
    wherein the controller is configured to communicate data to the inverter that inverts the data to create inverted data, wherein the comparator is configured to compare the inverted data to at least one reference voltage and to generate corrected data based, at least in part, on the comparison of the inverted data to the at least one reference voltage, wherein the cable is configured to communicate the corrected data to a power supply at the near end of the cable so that the power supply can supply a power through the cable to the far end of the cable.

9. The system for supplying power to the merchandise item of claim 8 further comprising:
    biasing elements located in the cable to create hysteresis between the inverted data and the at least one reference voltage.

10. The system for supplying power to the merchandise item of claim 9 wherein the comparator is further configured to operate with respect to:
    a low threshold, wherein when the corrected data is high, the comparator is configured to not allow the corrected data to go low until the inverted data goes below the low threshold; and
    a high threshold, wherein when the corrected data is low, the comparator is configured to not allow the corrected data to go high until the inverted data goes below the high threshold.

11. The system for supplying power to the merchandise item of claim 8 further comprising:
    a low voltage dropout (LOO) regulator configured to stabilize the voltage at an analog-to-digital converter (ADC) in the controller.

12. The system for supplying power to the merchandise item of claim 8 further comprising:
    a Schottky diode and a capacitor configured to maintain a high voltage value when the single communication wire is driven low.

13. The system for supplying power to the merchandise item of claim 8 further comprising:
    a voltage measurement device at the far end of the cable configured to create a far end voltage value of a far end voltage at the far end of the cable, wherein the controller is configured to transmit the far end voltage value over the second wire between the inverting device and the controller and the single communication wire to the comparator, wherein the power supply is adapted to supply a power through the cable to the far end of the cable that is, at least in part, based on the far end voltage value.

14. The system for supplying power to the merchandise item of claim 8 wherein the inverting device comprises a bipolar junction transistor (BJT) comprised of:
    a gate connected to the second wire;

an emitter connected to the single communication wire; and a collector connected to ground.

15. The system for supplying power to the merchandise item of claim 8 wherein the comparator comprises an operation amplifier.

16. A method comprising:
receiving communication data from a near end of a cable that has a near end and a far end;
comparing the data using hysteresis to at least one of the group of: a reference threshold, a high threshold, and a low threshold;
resetting the data to produce corrected data, wherein the resetting comprises resetting the data to a high value or a low value based, at least in part, on the comparing; and
wherein the corrected data can provide a power supply at least one parameter needed for supplying a power at the far end of the cable.

17. The method of claim 16 further comprising:
connecting the far end of the power cable to a merchandise item on display at a retail display and;
connecting the near end of the power cable to the power supply.

18. The method of claim 16 wherein the resetting further comprises:
when the corrected data is high, resetting the data to a low value when the communication data crosses the low threshold; and
when the corrected data is low, resetting the data to a high value when the communication data crosses the high threshold.

19. The method of claim 16 further comprising:
measuring a voltage at the far end of the cable, wherein the communication data represents, at least in part, the measured voltage.

* * * * *